Oct. 8, 1968 S. R. ORENS 3,404,873
HUMIDIFYING AND MOISTURE DIFFUSING ATTACHMENT
FOR MOTOR VEHICLE HEATERS
Filed Oct. 23, 1965 6 Sheets-Sheet 2
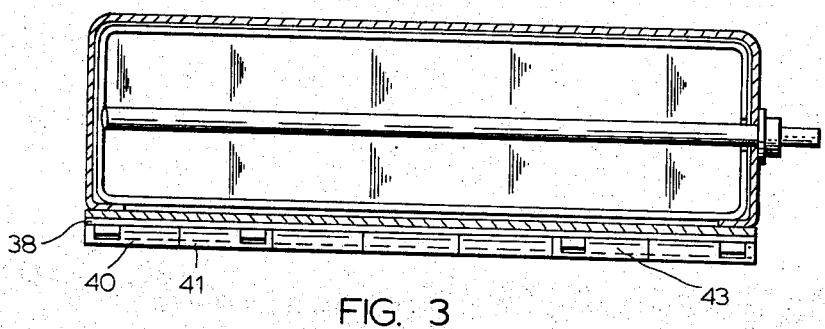
FIG. 3
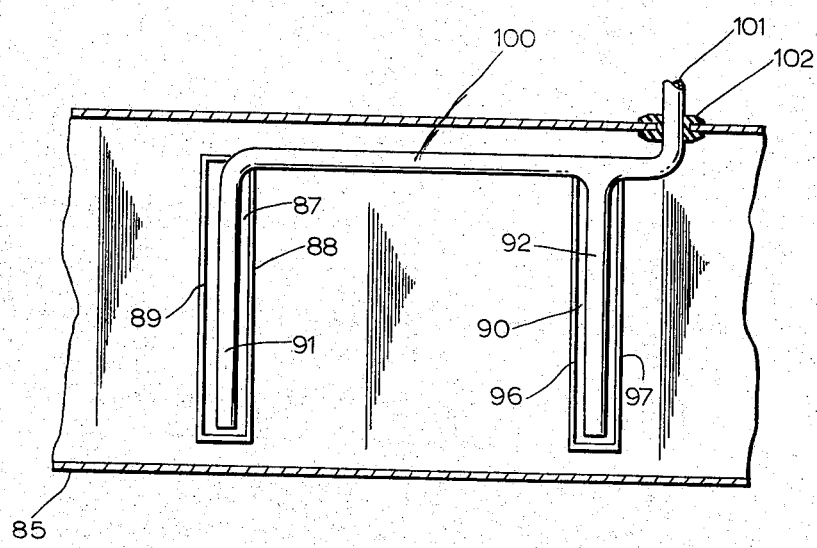
FIG. 11
SYDNEY R. ORENS
INVENTOR.
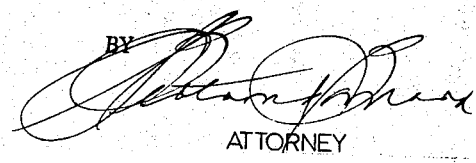
ATTORNEY

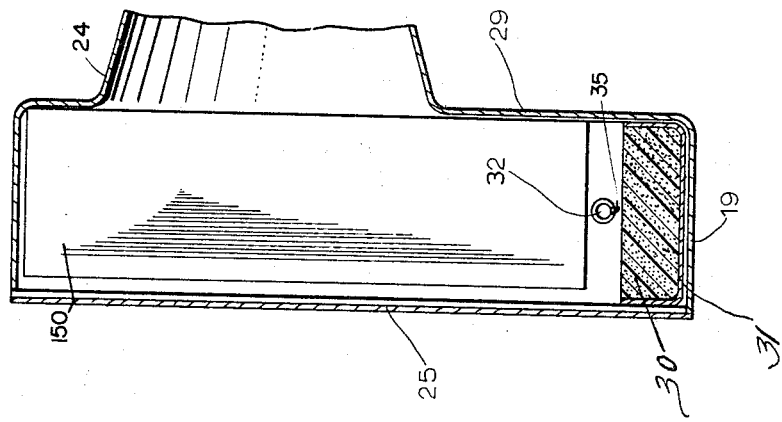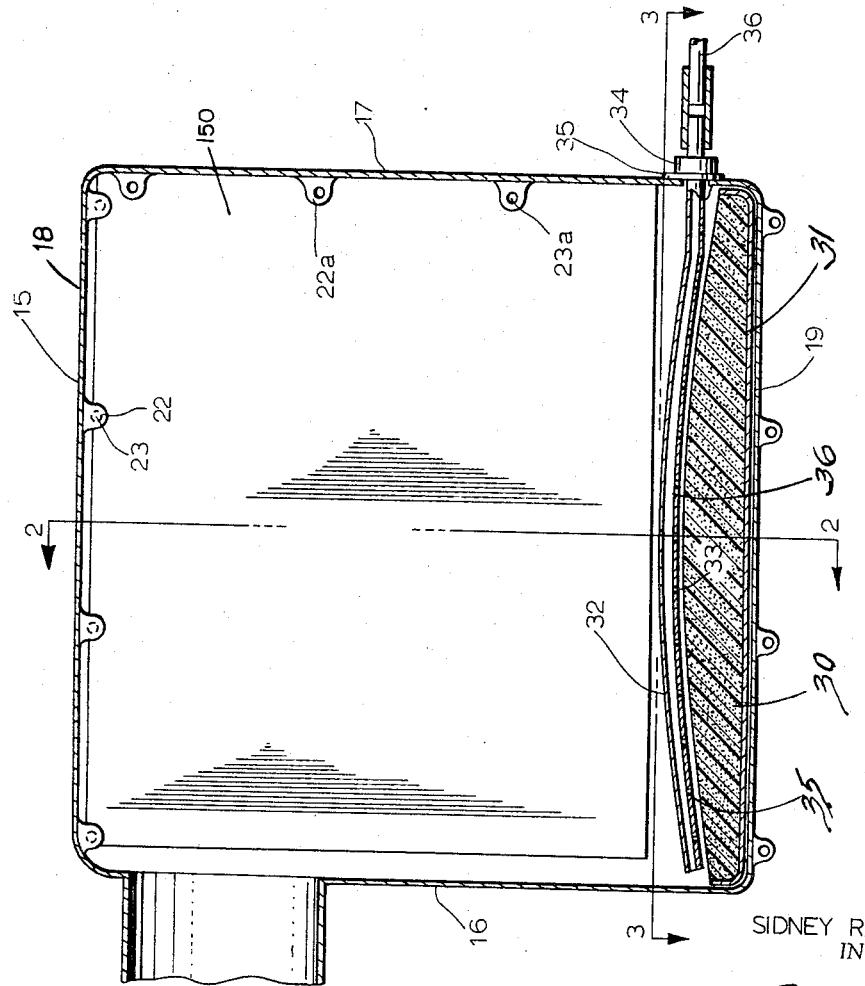

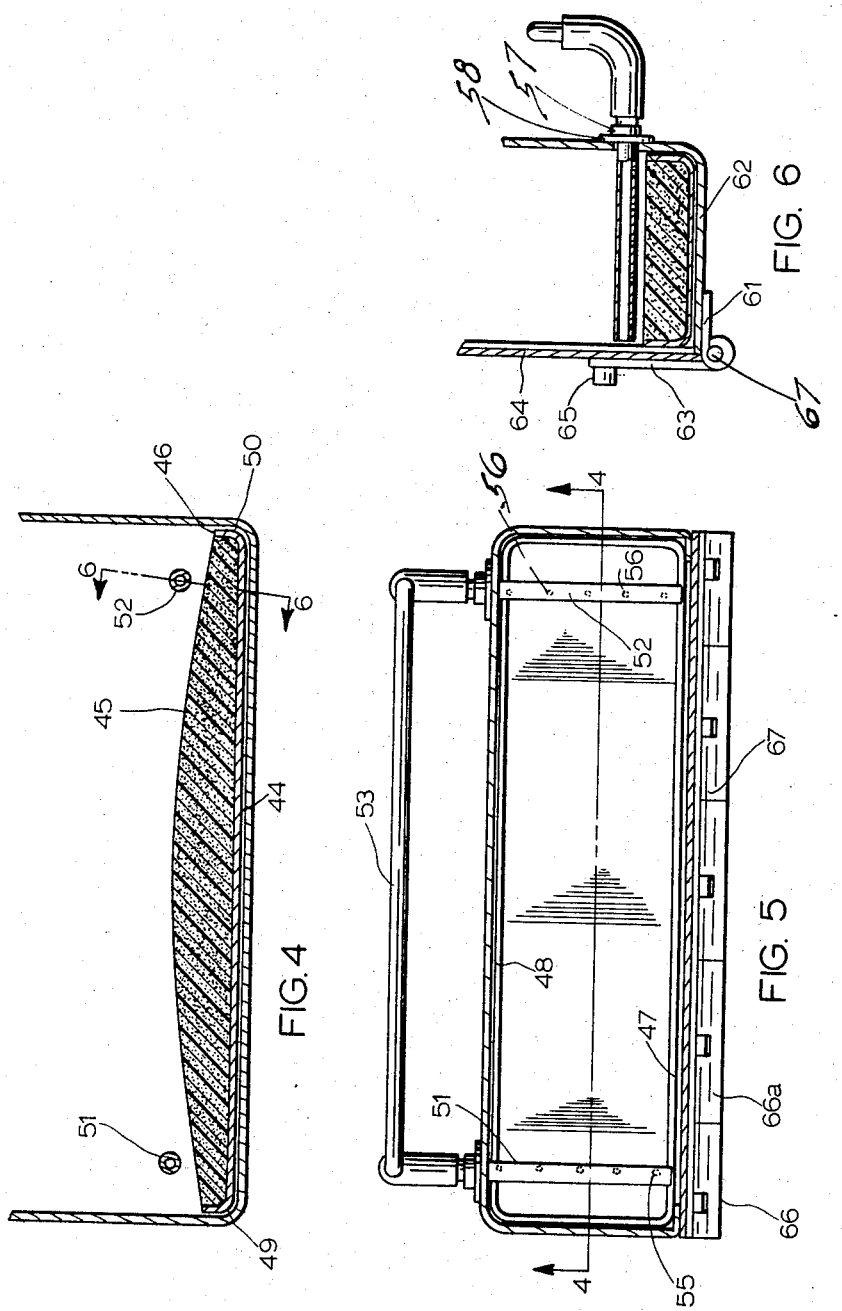

Oct. 8, 1968 S. R. ORENS 3,404,873
HUMIDIFYING AND MOISTURE DIFFUSING ATTACHMENT
FOR MOTOR VEHICLE HEATERS
Filed Oct. 23, 1965 6 Sheets-Sheet 4
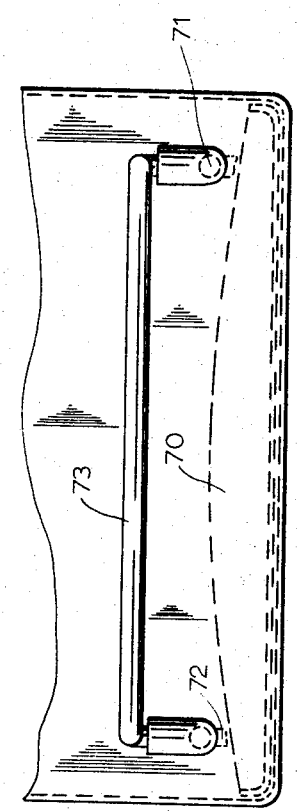
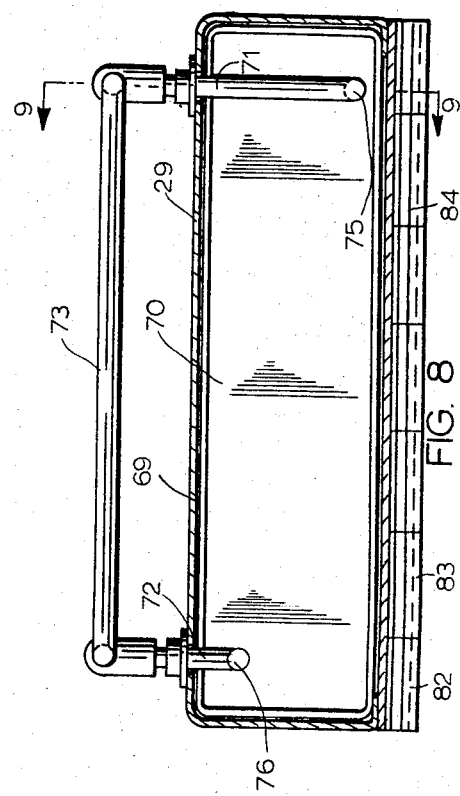
SIDNEY R. ORENS
INVENTOR.
ATTORNEY

SYDNEY R. ORENS
INVENTOR.

ATTORNEY

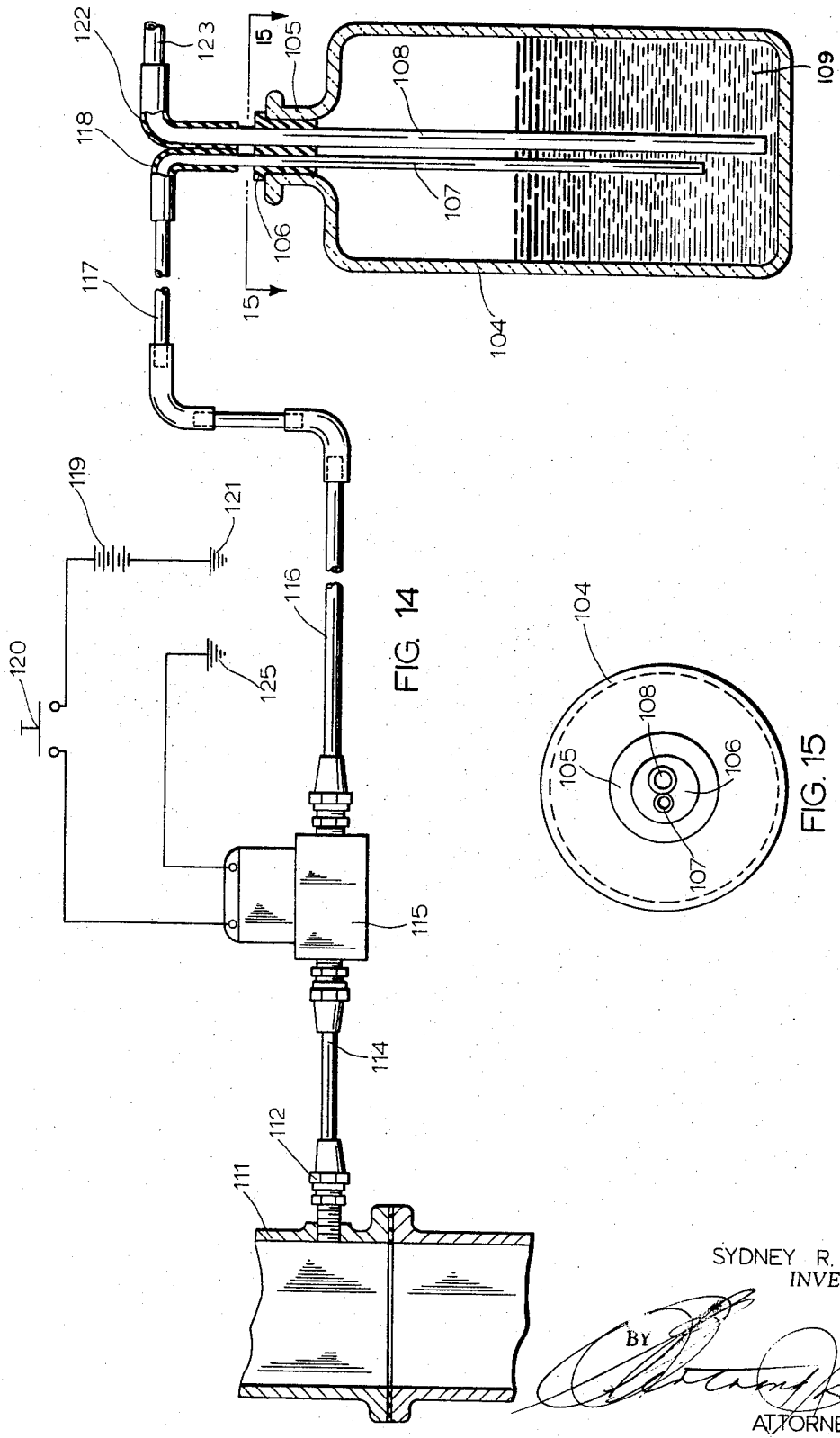

United States Patent Office 3,404,873
Patented Oct. 8, 1968

3,404,873
HUMIDIFYING AND MOISTURE DIFFUSING ATTACHMENT FOR MOTOR VEHICLE HEATERS
Sidney R. Orens, 63—95 Austin St.,
Rego Park, N.Y. 11374
Filed Oct. 23, 1965, Ser. No. 503,804
10 Claims. (Cl. 261—141)

ABSTRACT OF THE DISCLOSURE

A device for heating and humidifying air or for distribution in a motor vehicle having a moisture retaining and distributing pad removably mounted and solely moistened to humidify air passing over it so that the humidity of the air distributed in the vehicle is a function of the moistness of the pad and the velocity and temperature of the flow of air over the pad.

---

This invention relates generally to heaters for motor vehicles and the like and is particularly directed to an attachment for humidifying and supplying and distributing moisture through the air circulated by a vehicle heater.

A primary object of the invention is to provide an attachment for a motor vehicle heater which will provide a predetermined and controlled quantity of moisture for humidifying the air circulated by the heater, and diffusing and distributing the moisture through the air circulated by the heater.

Another object is to provide a water supply and diffusion system which is automatically activated by the motor vehicle and to distribute the moisture with the air circulated by the heater.

A primary feature of the invention is that the moisture is drawn from a moisture supply source fitted to the heater. The moisture is drawn through and circulated with the air and humidifies the air.

Another feature is that a porous plastic or other type of moisture supply source is mounted within the heater. The water for the moisture supply source is supplied by a plurality of tubular distributors, which are fed from a water reservoir.

Another feature is that water from the water reservoir may be controlled by air under pressure, supplied within the vehicle, or by gravity, depending upon the relative location of the heater and the water reservoir.

A primary feature of the invention is that the air distributed by the heater can be aromaticized, by including with the moisture distributing device a medicated solution which can be circulated with the water vapor which is supplied to the heater.

Still another feature of the invention is that the amount of moisture or water vapor supplied by the water is controlled by the operator, the air under pressure for forcing the fluid to a moisture distribution portion of the heater is supplied by an air intake to the carburetor of the vehicle to which the heater is attached. In a modification of the construction, gravity may be used to supply fluid to the moisture distribution system, thus eliminating the pressurized air.

The accompanying drawing, illustrative of one embodiment of the invention, and several modifications thereof, together with the description of their construction and the method of operation, mounting and utilization thereof, will serve to clarify further objects and advantages of the invention.

In the drawings:

FIG. 1 is a front elevation view and partial vertical section of an automotive heater mounted in a vehicle;

FIG. 2 is a vertical section taken on the line 2—2 of FIG. 1;

FIG. 3 is a cross-section taken on the line 3—3 of FIG. 1;

FIG. 4 is a fragmentary vertical section taken on the line 4—4 of FIG. 5;

FIG. 5 is a cross-section of a modification of the heater in FIG. 1;

FIG. 6 is a fragmentary cross-section through a portion of the housing shown in FIGS. 4 and 5;

Figure 10:
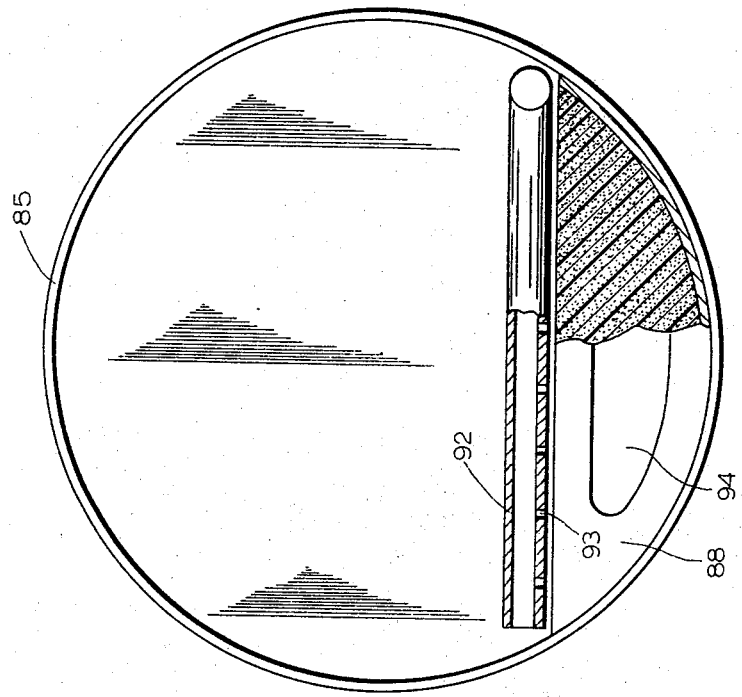
Figure 13:
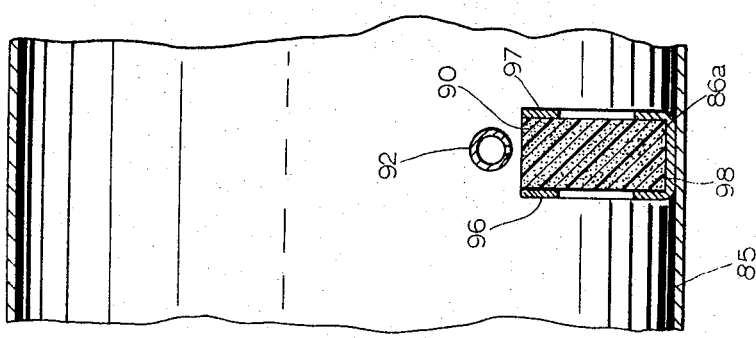
Figure 12:
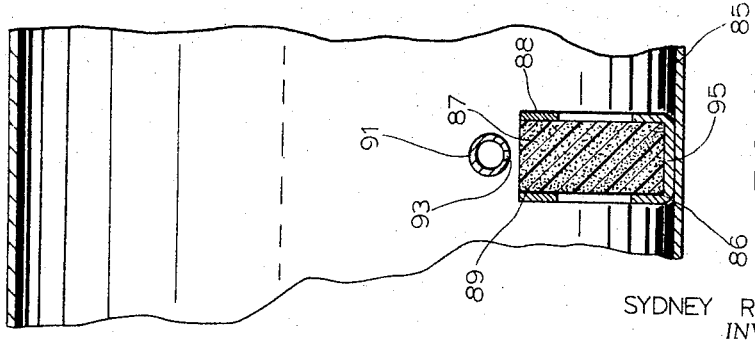

FIG. is a fragmentary view taken on the line 7—7 of FIG. 9;

FIG. 8 is a cross-section and partial plan view of the housing shown in FIG. 7;

FIG. 9 is a fragmentary cross-section view taken on line 9—9 of FIG. 8;

FIG. 10 is a cross-section through a modification of the construction shown in FIGS. 1, 2, and 3, the section being taken through one of the tubes transmitting heated air from the heater to the vehicle;

FIG. 11 is a longitudinal section view through the air distribution tube shown in FIG. 10;

FIG. 12 is a fragmentary cross-section view through one of the moisture retainer shown in FIG. 11;

FIG. 13 is a fragmentary cross-section view through the second porous moisture retainer and holder shown in FIG. 11;

FIG. 14 is a front elevation view of an apparatus for supplying water or other fluid to the apparatus in FIGS. 1, 2 and 3; and FIG. 15 is a cross-section view through the line 15—15 of FIG. 14.

It will be understood that the following description of the construction and the method of operation of the humidifying and moisture diffusing attachment for motor vehicle heaters, is intended as explanatory of the invention and not restrictive thereof. In the drawing, the same reference numerals designate the same parts throughout the various views, except where otherwise indicated.

One embodiment of the construction shown in FIGS. 1, 2 and 3, comprises a hollow housing 15, of rectangular or other suitable cross-section. The housing is formed of sheet steel or other suitable material and consists of a pair of side walls 16, 17, a top wall 18 integral with or attached to the side walls, and a bottom wall 19, attached to the side walls. The forward edge of the top, bottom and side walls is open. A plurality of flanges or ears 22, 22a, each of which has an internally threaded or other suitable opening 23, 23a therethrough as hereinafter described, project from the top and side walls as shown. A thin, flat front cover 25 formed of sheet steel, or other suitable material is located adjacent the front end of the top and side walls. The front cover has a plurality of openings therethrough aligned with the openings 23, 23a through the ears 22, 22a to allow screws or other suitable attaching means to be inserted therethrough to attach the front cover to the housing.

A core 150 having a plurality of openings therethrough is inserted in the interior of the housing 15. The core has a plurality of passages therethrough, through which hot water or other heating fluid is passed to heat air passing through the housing. A tubular outlet opening 24 is provided in the rear wall 29 of the housing to allow the heated air passing through the core to be circulated through the motor vehicle in which the heater is mounted.

In order to moisturize or humidify the heated air passing through the housing 15, a moisturizing pad 30, made of a porous plastic material is inserted in a flat open pan 31 fitted to the bottom of the housing. Water or other fluid for supplying moisturizing fluid to the pad 30 is supplied through a tube 32 of circular cross-section and arcuate form following the contour of the top of the moisturizing pad 30. Water or other fluid for moisturizing the air is supplied from a reservoir or other supply source which is hereinafter described in greater detail. In order to allow the fluid passing through the tube 32 to reach the moisturizing pad 30, a plurality of openings 33, are cut through the bottom wall of the supply tube. The fluid passes directly to and is absorbed by the top of the moisturizing pad 30.

The tube 32 is removably inserted in the housing through an opening in the right-hand side wall 17 of the housing 15. A tubular bushing 34 having a flange 35 integral therewith, which is attached to the side wall 17 of the housing supports the tube 32 within the housing. A portion of the tube 32 projects beyond the right-hand side-wall 17 of the housing. The tube 32 is attached to a fluid supply tube 36, which is is turn connected to the fluid supply source hereinafter described, by a flexible tubular hose connection 37, or other suitable connecting means.

While the pan 31 and the moisturizing pad 30 fitted thereto may be removed through the opening in the forward wall of the housing 15 when the front cover 25 shown in FIG. 2 is removed, an alternate means for removing the pan from the housing is shown in FIG. 3. This consists of a hinged construction for uncovering an opening in the forward wall of the housing, to allow the pan to be removed.

The hinged construction consists of a forward section 38, which is removably attached to the forward wall of the housing or the front cover 25 and a bottom section 39 hereinafter described in greater detail, which is attached to the bottom wall of the housing. The forward section 38 of the hinge which covers the opening in the forward wall or the forward cover of the housing, is removably attached to the forward wall or the forward cover by a plurality of screws, or other suitable attaching means.

A plurality of tubular hinge sections 40 are provided integral with the forward section 38 of the hinge. A group of mating equally-spaced tubular sections 41 are integral with or attached to the bottom section 39 of the hinge. A cylindrical hinge pin 43 is inserted through the two sets of tubular sections to allow the forward section 38 of the hinge to rotate about the hinge pin, thereby allowing the forward section 38 of the hinge, which covers the opening in the forward wall or the front cover of the housing to be opened. The pan 31 and the porous moisturizing pad 30 fitted thereto can thus be removed for cleaning, replacement, or other reason.

FIGS. 4, 5 and 6 show a modification of the humidification and moisturization construction shown in FIGS. 1, 2 and 3. The housing and the walls thereof, are substantially the same as those shown in FIGS. 1, 2 and 3, and hereinbefore described. The moisturizing construction consists of a moisturizing pad 45 of rectangular cross-sectional form. The upper edge of the pad is of arcuate cross-sectional contour. The pad 45 is fitted to and supported by a flat open pan 46, of rectangular cross-section. The pad is fitted to the interior of the pan. The pan is formed of sheet steel or other suitable material and consists of a front wall 47, a rear wall 48, a pair of end walls 49, 50 integral with the front and rear walls and a bottom wall 44 integral with, or welded to the front, rear and end walls. The top of the pan is open, as shown in FIG. 4.

Water or other fluid for supplying moisture to the pad 45 is supplied by a pair of parallel tubes 51, 52 located above the arcuate upper surface of the pad 45. The tubes are connected to a central supply line 53 which is fed from a supply source hereinafter described. The outer end of each tube is connected by an elbow or other suitable connecting means to the supply line.

Each of the tubes has a row of openings 55, 56 through the bottom wall thereof. The openings are either perpendicular to the axis of the housing, or angularly positioned relative to the housing, in a direction substantially perpendicular to the arcuate upper surface of the pad. Each of the tubes 51, 52 is removably inserted through an aligned opening in the rear wall 29 of the housing. A tubular bushing 57 having a flange 58 integral therewith, is attached to the rear wall of the housing. This type flange supports each of the tubes 51, 52 within the housing. A portion of each tube projects outwardly beyond the rear wall of the housing.

The tubes are connected to one another and to a supply source, by a central supply tube 53 which is connected to a supply source hereinafter described. The end of each of the tubes is connected to the central tube by a tubular elbow or other suitable attaching means. In order to allow the pan 46 and the moisturizing pad to be removed through an opening in the forward wall of the housing, an opening is cut through the forward wall. The opening is covered by one section of a hinge cover, the other or bottom section is attached to the bottom wall 19 of the housing.

The hinge cover shown in FIGS. 5 and 6, consists of a bottom section 61 which is attached to the bottom wall 62 of the housing, and a forward section 63, which is removably attached to the forward wall 64 of the housing or the forward cover by a plurality of screws 65, inserted through the front section. A plurality of tubular sections 66, is integral with the bottom section 61 of the hinge cover. A mating set of aligned tubular sections 68 is integral with or attached to the removable front flange 63 of the hinge section. A long cylindrical pin 67 is inserted through the central opening in the tubular sections of the hinge cover. The pin supports the forward section of the hinge to allow it to be moved to the closed position shown in FIG. 6.

FIGS. 7 and 8 and 9 show a modification of the attachment shown in FIGS. 4, 5 and 6. The housing and the walls thereof are substantially the same as those shown in FIGS. 4, 5, and 6. The moisturizing construction or device consists of a flat pad 70, of rectangular cross-section. The pad is made of a porous plastic or other suitable material and is fitted to the interior of a pan 69, which is substantially the same as that shown in FIGS. 4, 5, and 6. The water or other fluid for supplying moisture to the top of the pad is supplied by a pair of substantially parallel tubes 71, 72 located above the top of the pad. The tubes 71, 72 are connected to a central supply line 73, which is fed from a supply source, in the same manner as that shown in FIGS. 4, 5, and 6. The outer end of each of the tubes is connected by an elbow 74 or other suitable connecting means to the central supply line. The outer end of one of the tubes 71 has an arcuate discharge section 75, located near the outer end of the pad 70. The second tube 72 also has an arcuate discharge section 76 near the opposite end of the pad thus forming a shorter tube than that on the opposite side.

Instead of the discharge end of the tubes 71, 72 being located at opposite ends of the pad, as shown in FIG. 8, the ends of both tubes may be located at the same end of the pad, making both tubes long, or at the opposite end of the pad, making both tubes short. Moreover, the arcuate discharge end may be located at substantially the center of the pad, thus making both tubes of even length considerably shorter than that shown in FIG. 9. Each of the tubes 71, 72 is removably inserted through an aligned opening in the rear wall 29 of the housing.

A tubular bushing 77 having a flange 78 integral therewith is provided on each tube. The flange which is attached to the rear wall of the housing, supports each of the respective tubes 71, 72 within the housing. A portion of each of the tubes projects beyond the rear wall 29 of the housing.

In order to allow the pan, and the pad supported thereby to be removed an opening in the forward wall or in the cover located at the forward face, of the housing is provided. The opening through the forward wall of the housing is covered by the forward section 80 or wing of a hinge, the outer section 81 is fixedly attached to the bottom wall 19 of the housing. The hinge cover shown in FIGS. 8 and 9 consists of a forward section 80 which is removably attached to the forward wall or cover 25 of the housing, by a plurality of screws 79 or other suitable attaching means, and a bottom section 81, which is attached to the bottom wall 19 of the housing.

A plurality of tubular sections 82 is integral with the bottom section 81 of the hinge. A mating set of aligned tubular sections 83 is provided integral with or attached to the removable forward section of the hinge. A long cylindrical pin 84 is inserted through the central opening in the tubular sections 82, 83 of the hinge. The pin supports the forward section 80 of the hinge to allow it to be moved to the closed position shown in FIG. 9. The forward section 80 of the hinge has a plurality of openings through the upper portion thereof. A plurality of headed screws 79 or other suitable attaching means inserted through the openings removably support the forward section 80 of the hinge.

Another embodiment of the heater according to the invention is shown in FIGS. 10, 11, 12 and 13. In this embodiment, the humidifier is mounted inside a tube 85, which is attached to the heater for distributing heated air through the car or other type vehicle. The moisture distribution apparatus shown in section in FIG. 12, consists of a hollow trough 86 formed of sheet metal, with a moisture distribution 87 formed of a porous plastic material such as sponge rubber or other suitable material. The moisture distributor is of cylindrical segmental form following the contour of the trough.

The trough consists of a first side wall 89 of circular segmental form, a substantially parallel second side wall 88, of the same form, and a bottom wall 95 of arcuate contour following the contour of the inner circumference of the distribution of the tube 85. Water or other moisturizing fluid is fed to the individual moisture distributors 87, 90, by a pair of tubes 91, 92 such as those shown in FIG. 11. Each of the tubes 91, 92 has a plurality of openings 93 through the bottom wall thereof to allow the moisture to pass from the tubes to the moisture distributors. The side walls 88, 89 of the trough may be made integral with the bottom wall or attached thereto by welding, brazing, or other suitable attaching means to form a finished one-piece trough.

Each of the side walls of the trough has an opening 94 of circular, arcuate segmental or other suitable form therethrough, as shown in FIG. 10, to lighten the side wall and allow air passing through the distribution tube to reach the moisture distributor. The second moisture distribution apparatus shown in FIG. 13 also consists of a hollow trough 86 which is substantially the same as that shown in FIG. 12, with a moisture distributor 90 formed of a porous plastic material or other suitable material, fitted to the interior of the trough.

The trough consists of a pair of side walls 96, 97 of circular segmental form at the sides thereof, and a bottom wall 98, of arcuate contour similar to that shown in FIG. 12. The side walls 96, 97 are either integral with the trough, or attached by welding, brazing or other suitable means to the bottom wall of the trough. A tube 92 similar to that shown in FIG. 12 is located above the top of the moisture distributor. The tube has a plurality of aligned openings through the bottom wall thereof in the manner shown in FIG. 10. The side walls 96, 97 of the trough may be integral with the bottom wall 98 thereof, or attached thereto by welding, brazing or other suitable means.

A central connecting feed tube 100 is connected to the two tubes 91, 92 and a feed line 101 integral with, or attached to the connecting tube 100 is located at one end of the connecting tube 100. A feed line 101 is connected to the feed tube 100 and passes through the wall of the tube 85. A tubular grommet 102 or other suitable seal means is attached to the wall of the tube to provide a seal between the feed line 101 and the wall of the distributor tube 85.

FIG. 14 shows one method of supplying water or other fluid to the feed tubes shown in FIGS. 1, 2 and 3. The water or other moisturizing fluid is contained in a container, for example a bottle 104, or other suitable container. The bottle has a small circular neck 105 integral with the upper end thereof, into which a stopper 106, formed of rubber or other compressible material is fitted. The stopper 106 has a pair of parallel openings therethrough into which a pair of tubes 107, 108 is inserted.

These tubes include a relatively large diameter tube 108, which extends into the water 109 or other fluid contained in the container. The tube may be made of a plastic or other suitable material. A smaller diameter tube 107, which is inserted through the second opening in the stopper and also made of a plastic material, extends into the water or other fluid to feed air under pressure to force the water out the second tube 108 in the manner hereinafter described.

Air under pressure is supplied from a tube 111, connecting the vehicle air cleaner to the air inlet end of the carburetor to feed the smaller air supply tube 107, fitted to the container. The air passes through a tubular fitting 112 to a tubular connection 114, which is connected to a solenoid controlled valve 115, shown in FIG. 14. From the outlet end of the solenoid controlled valve 115 air is fed through two tubular lines 116, 117. The second of these lines is connected by an elbow 118, or other suitable fitting to the air supply tube in the container 104.

As shown in FIG. 14, the voltage for the solenoid in the solenoid controlled valve 115 is supplied by a battery 119 of the vehicle in which the unit is mounted. A separate battery may be supplied for the purpose. A switch 120, which may be a push-button or other type of switch is connected in the line between the battery 119, and the solenoid controlled valve 115. The opposite terminal of the battery is connected to ground at 121. The opposite end of the solenoid controlled valve is also connected to ground at 125, thus completing a circuit through the solenoid of the solenoid controlled valve 115.

The water, or moisture supply tube 108 in the container is connected by an elbow 122 to a discharge tube 123 which is connected by tubular means to the water supply tube 36 shown in FIGS. 1 and 2, or one of the other water supply tubes shown in the other modifications, of the construction shown in the other drawings. In place of water, the container may be filled with water having an anti-freeze solution dissolved therein, to prevent the freezing of the water. Moreover, instead of water, an aromaticized solution may be placed in the container 104, thus distributing any type of aromatic solution with the air circulated by the heater. In place of water, a medicated solution containing suitable medication for assistance to asthmatic persons, or other suitable medication can be supplied to the humidifying apparatus shown in FIGS. 1–3, and the other modifications. A glycol spray can be used instead of water, for feeding fluid to the moisturizing pads, thereby providing a soothing effect on the passenger with the moisture distributed by the heated air.

Instead of the water on other fluid supply mechanism shown in FIG. 14, other suitable means for supplying fluid to the distribution tubes of the heater may be used. Where the heater is mounted in a location relative to the vehicle so that gravity fluid feed is possible, the container for water, or other fluid, may be mounted in an elevated location relative to the heater so that the water or other fluid is fed by gravity to the tubes supplying fluid to the moisture distributors of the heater.

The heated air distributed by the blower of the heater passes over the various types of moisture distributors or pads shown in the drawings, thus picking up a quantity of moisture and humidifying the heated air supplied to the vehicle. The amount of moisture fed to the humidifying system is controlled by the amount of water or other fluid supplied by the fluid supply system shown in FIG. 14. The amount of fluid is controlled by a solenoid controlled valve or other type of valve, which controls the volume of fluid supplied in a unit of time. The solenoid controlled valve is controlled by a push button, or other type of switching mechanism suitably disposed, for example on the vehicle dashboard.

The air after passing through the heating coils or other heating means in the heater passes over one of the humidifying pads, or other moisture distribution units, thereby picking up a predetermined quantity of moisture and circulating it with the heated air. The amount of fluid supplied by the fluid supply system shown in FIG. 14, is controlled by the length of time during which the solenoid controlled valve is in operation, which is in turn manually controlled by a push button or other type of switching mechanism. In the construction shown in FIG. 14, air under pressure supplied from the inlet end of the carburetor, is utilized to force the fluid out of the container, into the fluid distribution system.

The moisture distributing pads, or other moisture distributors, shown in the drawings, may be made of a porous plastic material, sponge rubber, or other suitable material, which will retain a certain amount of moisture, and distribute it to the air circulated over it. Any suitable tray or container may be used for supporting the moisturizing pad, depending upon the shape and size of the pad, the material of which it is made, and the location of the moisture distribution pad, relative to the heater, and the other parts of the vehicle.

What I claim and desire to secure by Letters Patent is:

1. A device for heating and humidifying air for a motor vehicle, comprising means defining a housing, means defining a tubular outlet connected to the housing, means fitted to the housing operative to heat air, a combination humidifying and moisture distribution mechanism comprising an absorbent, moisture retaining and distributing pad, means comprising a pad holder removably supporting the moisture retaining and distributing pad horizontally, a source of fluid, means operative to transfer controlled amounts of fluid from said source directly to the moisture humidifying and distributing pad solely to moisten said pad, and means to flow heated air at least over said pad for humidifying said heated air and for distributing it to the vehicle whereby humidity of said air is controlled by the moistness of said pad and the velocity and temperature of the flow of air over said pad.

2. A device for heating and humidifying air for a motor vehicle comprising, means defining a hollow housing, air outlet means connected to the hollow housing, means fitted to the hollow housing operative to heat air passing through the hollow housing, a combination humidifying and moisture distribution mechanism comprising a moisture retaining and distributing means located within the hollow housing, means fitted to the hollow housing operative to support the moisture retaining and distributing means, a source of fluid external to said housing, means operative to transfer fluid from said external source to the moisture retaining and distributing means, and means operative to supply fluid under pressure to said fluid transfer means, the housing including a bottom wall, side walls attached to the bottom wall, and a forward wall attached to the bottom wall, the forward wall of the housing having an elongated opening therethrough, cover means operative to removably cover the elongated opening, hinge means supported by the bottom wall of the housing operative to removably support the cover means fitted to the elongated opening in the forward wall, the combination moisture retaining and distribution means comprising a porous pad of a plastic material fitted to the interior of the hollow housing, a hollow pan following substantially the contour of the pad and surrounding the pad to support the pad within the hollow housing, said pan being located near the hinged cover fitted to the elongated opening in the forward wall of the housing to facilitate removal of the pan from the housing.

3. A device for heating and humidifying air for a motor vehicle comprising, means defining a hollow housing, air outlet means connected to the hollow housing, means fitted to the hollow housing operative to heat air passing through the hollow housing, a combination humidifying and moisture distribution mechanism comprising a moisture retaining and distributing means located within the hollow housing, means fitted to the hollow housing operative to support the moisture retaining and distributing means, a source of fluid external to said housing, means operative to transfer fluid from said external source to the moisture retaining and distributing means, and means operative to supply fluid under pressure to said fluid transfer means, the housing including a rear wall and side walls fixedly attached to the rear wall, the side walls being substantially perpendicular to the rear wall, the combination moisture retaining and distributing means comprising a porous pad of a plastic material fitted to the interior of the hollow housing, and a hollow pan operative to support the pad within the hollow housing, the fluid transfer means comprising a long tube removably inserted through a side wall of the hollow housing, said tube being disposed adjacent the upper surface of the porous pad, said tube having a plurality of openings through the wall thereof, the openings being disposed to allow fluid passing through the tube to reach the upper surface of the pad, tubular means connecting one end of the tube to said fluid supply source, and means attached to the tube removably attached to the side wall of the housing to support the tube within the housing.

4. A device for heating and humidifying air for a motor vehicle comprising, means defining a hollow housing, air outlet means connected to the hollow housing, means fitted to the hollow housing operative to heat air passing through the hollow housing, a combination humidifying and moisture distribution mechanism comprising a moisture retaining and distributing means located within the hollow housing, means fitted to the hollow housing operative to support the moisture retaining and distributing means, a source of fluid external to said housing, means operative to transfer fluid from said external source to the moisture retaining and distributing means, and means operative to supply fluid under pressure to said fluid transfer means, the housing including a rear wall and side walls fixedly attached to the rear wall, a forward wall spacedly located relative to and substantially parallel to the rear wall, and a bottom wall fixedly attached to the rear and side walls, the combination moisture retaining and distribution means comprising a porous pad having a rectangular contour fitted to the interior of the hollow housing, and a hollow pan following the contour of the pad to receive and support the pad fitted to the interior of the hollow housing, the fluid transfer means comprising a pair of substantially parallel tubes inserted through the rear wall of the housing, the tubes being disposed near the upper surface of the porous pad, a portion of each of said tubes projecting outward beyond the rear wall of the housing, tubular connecting means connecting the projecting portions of the tubes to provide fluid for the tubes, and tubular means connecting one end of the tubular connecting means to said fluid supply source, and fluid supply source comprising a pressurized fluid supply source, each of the parallel tubes having a plurality of openings through the outer wall thereof and said openings being disposed to supply fluid to the porous pad.

5. A device for heating and humidifying air for a motor vehicle comprising, means defining a hollow housing, air outlet means connected to the hollow housing, means fitted to the hollow housing operative to heat air passing through the hollow housing, a combination humidifying and moisture distribution mechanism comprising a moisture retaining and distributing means located within the hollow housing, means fitted to the hollow housing operative to support the moisture retaining and distributing means, a source of fluid external to said housing, means operative to transfer fluid from said external source to the moisture retaining and distributing means, and means operative to supply fluid under pressure to said fluid transfer means, the housing including a rear wall, side walls attached to the rear wall and substantially perpendicular thereto, a forward wall, substantially parallel to the rear wall, and a bottom wall fixedly attached to the rear and side walls, the forward wall of the housing having an elongated opening therethrough, near the bottom wall, cover means operative to removably cover the opening, hinge means supported by the bottom wall of the housing oparative to removably support the cover means fitted to the elongated opening, the combination moisture retaining and distribution means comprising a porous pad of substantially rectangular contour, fitted to the interior of the hollow housing, and a hollow pan following substantially the contour of the pad operative to receive and support the pad, the pan being located near the elongated opening through the forward wall of the housing, the fluid transfer means comprising a pair of substantially parallel tubes inserted through the rear wall of the housing, the tubes being disposed near the upper surface of the porous pad, a portion of each of said tubes projecting outward beyond the rear wall of the housing, tubular connecting means connecting the projection portions of the parallel tubes, to provide fluid for the tubes, and tubular means connecting one end of the tubular connecting means to said fluid supply source, said fluid supply source comprising a pressurized fluid supply source, each of the parallel tubes having a plurality of openings through the outer wall thereof, the openings being directed to the upper surface of the pad, and said openings being disposed to supply fluid to the porous pad.

6. A device for heating and humidifying air for a motor vehicle comprising, means defining a hollow housing, air outlet means connected to the hollow housing, means fitted to the hollow housing operative to heat air passing through the hollow housing, a combination humidifying and moisture distribution mechanism comprising a moisture retaining and distributing means located within the hollow housing, means fitted to the hollow housing operative to support the moisture retaining and distributing means, a source of fluid external to said housing, means operative to transfer fluid from said external source to the moisture retaining and distributing means, and means operative to supply fluid under pressure to said fluid transfer means, said housing including a rear wall, a pair of side walls attached to the rear wall and substantially perpendicular thereto, a bottom wall fixedly attached to the rear and side walls, and a forward wall substantially parallel to the rear wall attached to the bottom wall, the forward wall of the housing having an elongated opening therethrough, near the bottom wall, cover means operative to removably cover the elongated opening, hinge means supported by the bottom wall of the housing operative to removably support the cover means fitted to the forward wall, said combination moisture retaining and distribution means comprising a porous pad of substantially rectangular contour fitted to the interior of the housing, and a hollow pan following the contour of the pad operative to support the pad, said hollow pan being disposed near the elongated opening through the forward wall of the housing, said fluid transfer means comprising a pair of substantially parallel tubes inserted through the rear wall of the housing substantially perpendicular thereto, said tubes being disposed near the upper surface of the porous pad, a portion of each of said tubes projecting beyond the rear wall of the housing, tubular connecting means connecting the projecting portions of the parallel tubes, to provide fluid for the tubes and tubular means connecting one end of the tubular connecting means to said fluid supply source, each of the transfer tubes having a discharge end located at the free end thereof, the discharge end being located near the upper surface of the porous pad, the discharge ends being operative to supply fluid to the porous pad.

7. A device for heating and humidifying air for a motor vehicle comprising, means defining a hollow housing of rectangular cross-sectional contour, air inlet means connected to the hollow housing, a tubular air outlet means connected to the hollow housing, means fitted to the hollow housing operative to heat the air passing through the hollow housing, a combination humidifying and moisture distribution mechanism, including a moisture retaining and distribution means located within the hollow housing, means operative to transfer fluid from an external source to the moisture retaining and distribution means, means operative to supply fluid under pressure to the fluid transfer means, said housing including a rear wall, a pair of side walls attached to the rear wall, and substantially perpendicular thereto, a forward wall substantially parallel to the rear wall, and a bottom wall fixedly attached to the rear and side walls, the combination moisture retaining and distribution means comprising a porous pad of substantially rectangular form fitted to the interior of the hollow housing, and a hollow pan following substantially the contour of the pad operative to receive and support the porous pad, the fluid transfer means comprising a pair of substantially parallel tubes inserted through the rear wall of the hollow housing, the tubes being disposed near the upper surface of the porous pad, a portion of each of said tubes projecting outward beyond the rear wall of the housing, tubular connecting means connecting the projecting portions of the parallel tubes, to provide fluid for the tubes, and tubular means connecting one end of the tubular connecting means to a pressurized fluid supply source, and each of the parallel tubes having means therethrough operative to supply fluid to the porous pad.

8. A device for heating and humidifying air for a motor vehicle comprising, means defining a hollow housing, air inlet means connected to said housing, air outlet means connected to the hollow housing, means fitted to the housing operative to heat the air passing through the housing, a combination humidifying and moisture distribution mechanism comprising a moisture retaining and distribution means located within the housing, means fitted to the housing operative to receive and support the moisture retaining and distribution means, means operative to transfer fluid from an external source to the moisture retaining and distribution means, means operative to supply fluid under pressure to the fluid transfer means, said means supplying fluid under pressure to the moisture retaining and distribution means including a fluid container having an open neck, means to seal the open neck of the fluid container, said fluid container having a portion for receiving a quantity of fluid therein, a tubular discharge tube inserted in the interior of the container, said fluid discharge tube being immersed in operation in the fluid in the container, a tubular pressure air inlet inserted into the fluid container, a pressurized air supply source, tubular means connecting the pressurized air inlet to said pressurized air supply source, electrically actuated valve control means connected to the tubular connecting means to control the flow of pressurized air to the fluid container, the pressurized air from the tubular pressure air inlet being operative in operation to force fluid out of the tubular discharge tube thereby controlling the supply of fluid fed from the container.

9. A device for heating and humidifying air for a motor vehicle comprising, means defining a hollow housing of substantially rectangular cross-section, air inlet means connected to said housing, air outlet means connected to the hollow housing, means fitted to the housing operative to heat the air passing through the housing, a combination humidifying and moisture distribution mechanism comprising a moisture retaining and distribution means located within the housing, means fitted to the housing operative to receive and support the moisture retaining and distribution means, means operative to transfer fluid under pressure from an external source to the moisture retaining and distribution means, means operative to supply fluid under pressure to the fluid transfer means, the means supplying fluid under pressure to the moisture retaining and distribution means including a fluid container having a portion for containing a quantity of fluid therein, said fluid container having a reduced diameter open neck, means operative to seal the open neck of the fluid container, a fluid discharge tube inserted through the seal means into the interior of the fluid container, said fluid discharge tube being immersed in the fluid in the container, a tubular pressure air inlet inserted through the seal means into the interior of the container, the tubular pressure air inlet being immersed in the fluid, a pressurized air supply source, tubular means connecting the tubular pressure air inlet to said pressurized air supply source, solenoid actuated valve means connected to the tubular connecting means to control the flow of pressurized air to the fluid container, tubular means connecting an outlet end of the fluid discharge tube to said fluid transfer means thereby to supply fluid from the container to the moisture retaining and distribution means of the heater.

10. A device for heating and humidifying air for a motor vehicle comprising, means defining a hollow housing of substantially rectangular cross-section, air inlet means connected to the hollow housing, air outlet means connected to the hollow housing, means fitted to the hollow housing operative to heat the air passing through the hollow housing, a combination humidifying and moisture distribution mechanism comprising a moisture retaining and distribution means located within the hollow housing, means fitted to the hollow housing operative to receive and support the moisture retaining and distribution means, means operative to transfer fluid under pressure from an external source to the moisture retaining and distribution means, means comprising an external source operative to supply fluid under pressure to the fluid transfer means, the housing including a rear wall, a pair of side walls, attached to the rear wall, and substantially perpendicular thereto, a bottom wall fixedly attached to the rear and side walls, and a forward wall substantially parallel to the rear wall and attached to the bottom wall, the forward wall of the housing having an elongated opening therethrough near the bottom wall, cover means operative to removably cover the elongated opening, hinge means supported by the bottom wall of the housing operative to removably support the cover means fitted to the forward wall, the combination moisture retaining and distribution means comprising a porous pad of substantially rectangular contour fitted to the interior of the hollow housing, and a hollow pan following substantially the contour of the porous pad to receive and support the porous pad, said pan being disposed near the elongated opening through the forward wall of the housing, the fluid transfer means comprising a pair of substantially parallel tubes, inserted through the rear wall of the housing substantially perpendicularly thereto, the tubes being disposed near the upper surface of the porous pad, a portion of each of said tubes projecting beyond the rear wall of the housing, tubular connecting means connecting the portions of the tubes projecting beyond the rear wall of the housing to provide fluid for the transfer tubes, a pressurized fluid supply source, and tubular means connecting one end of the tubular connecting means to said pressurized fluid supply source, each of said transfer tubes having a discharge end of arcuate contour located at the free end thereof, the discharge end being located near the upper surface of the porous pad, and the discharge ends being disposed to supply fluid to the porous pad.

References Cited
UNITED STATES PATENTS

| | | | |
|---|---|---|---|
| 2,333,374 | 11/1943 | Guthrie | 261—97 |
| 2,431,146 | 11/1947 | Steele. | |
| 2,552,337 | 5/1951 | Matulaitis. | |
| 2,585,339 | 2/1952 | Miller | 21—74 |
| 2,649,081 | 8/1953 | Martienssen | 261—18 X |
| 3,033,193 | 5/1962 | Rathman | 261—94 X |
| 3,259,050 | 7/1966 | Grimm | 98—33 X |

RONALD R. WEAVER, *Primary Examiner.*

HARRY B. THORNTON, *Assistant Examiner.*